Feb. 3, 1959 H. W. SAMS 2,871,824
LEAKPROOF INK TUBE FOR BALL POINT PEN
Filed Aug. 8, 1957 2 Sheets-Sheet 1
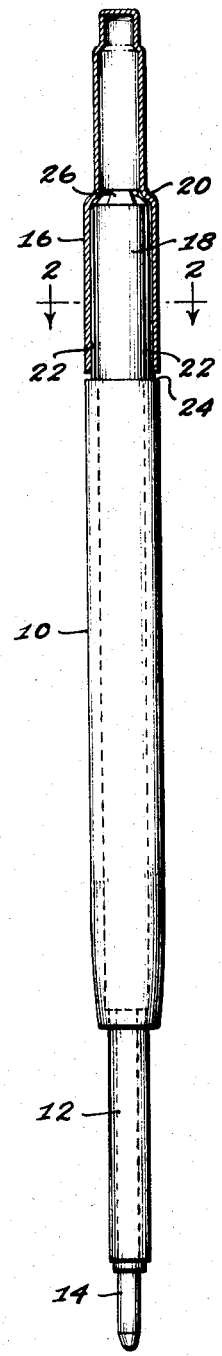
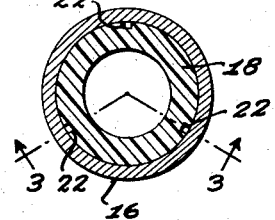
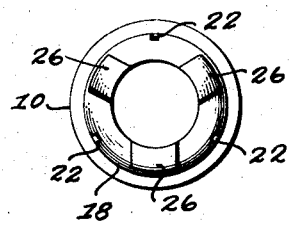
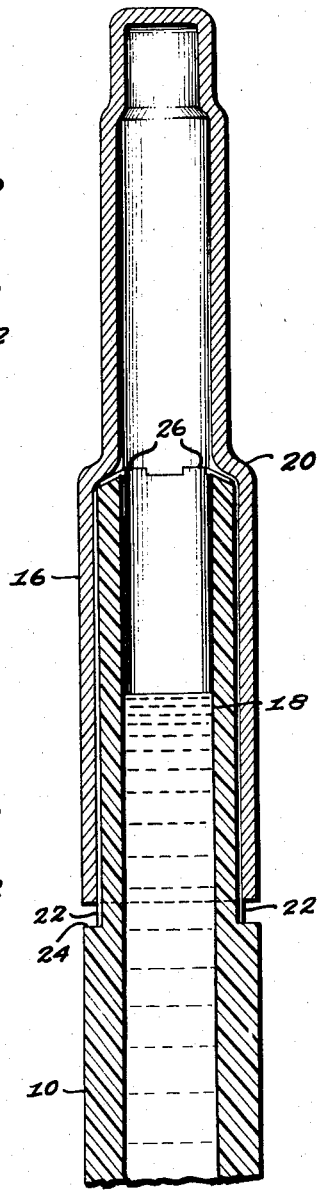
INVENTOR.
HERBERT W. SAMS
BY
Parrott & Richards
ATTORNEYS Feb. 3, 1959  H. W. SAMS  2,871,824
LEAKPROOF INK TUBE FOR BALL POINT PEN
Filed Aug. 8, 1957  2 Sheets-Sheet 2
Fig. 5
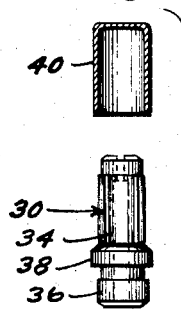
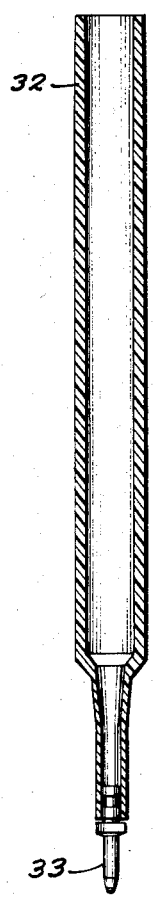
Fig. 6
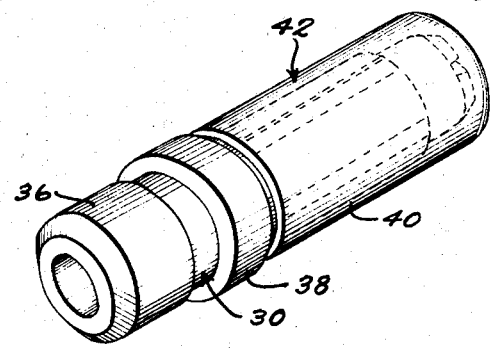
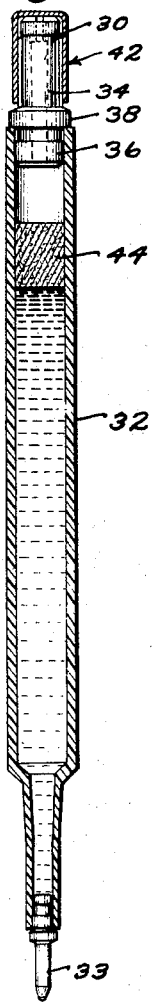
Fig. 7
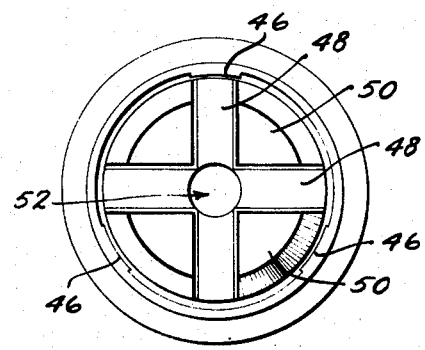
Fig. 8
Fig. 9  Fig. 10
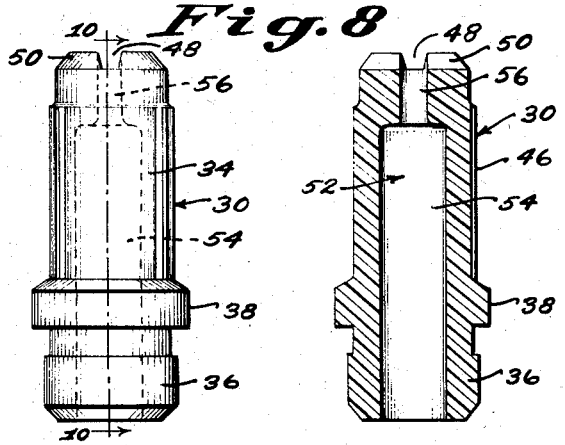
INVENTOR.
HERBERT W. SAMS
BY
Parrott & Richards
ATTORNEYS _United States Patent Office_

2,871,824
Patented Feb. 3, 1959

2,871,824

LEAKPROOF INK TUBE FOR BALL POINT PEN

Herbert W. Sams, Atlanta, Ga., assignor to Scripto, Inc., a corporation of Georgia Application August 8, 1957, Serial No. 677,059

6 Claims. (Cl. 120—42.4)

This invention relates to ball point pen ink tubes, and more especially to ink tubes that are leakproof even under the most adverse condition of a "dry socket" at the ball point. A dry socket may occur when writing with the ball point in an upward position, e. g., when writing on a wall or other vertical surface. A dry socket at the ball point is established when the ink seal is broken between the ball and socket which allows air to enter the ball point and permits atmospheric pressure to be established in the ink tube adjacent the ball. This causes the ink supply in the ink tube to flow to the rear end of the tube, opposite the ball point, when the pen is inverted and result in leakage of the ink therefrom.

Depending upon the internal size, diameter, of the ink tube, the rear end of the ink column may not require a stabilizing means. Tubes having an internal diameter of about 2 to 3 millimeters, or less, are commonly known as "capillary" size tubes and do not require stabilization of the rear end of the ink column under normal, i. e., "wet socket" operating conditions. Under these conditions and even if the pen is inverted but not operated in the inverted position, the plastic type ink used in the capillary ink tube will not escape from the open rear end of the tube. This is due to the fact that the meniscus of the ink column in a "capillary" ink tube is stable and will not break when the ink column is inverted.

Ball pens employing ink tubes larger than capillary size require stabilization of the rear end of the ink column to prevent leakage of the plastic ink therefrom upon inversion of the tube. The meniscus of the ink column of this relatively large diameter is not stable and will break when inverted. To meet this problem in the large diameter ink tube, a so-called "grease seal" has been used on the top of the ink column which moves thereon toward the point as the ink is expended. This grease seal serves the purpose of stabilizing the meniscus of the ink column in the large diameter ink tube so that the ink will not leak from the otherwise open end of the ink tube even when inverted, provided the ball point socket remains wet and thereby excludes atmospheric pressure on the ink column within the ball point. This grease seal may be used in the above-mentioned smaller diameter capillary size ink tube, if desired, to avoid air from being in direct contact with the top of the ink column or to further insure meniscus stabilization.

Irrespective of the internal size, diameter, of the ink tube, the grease seal device is not effective under dry socket conditions for preventing leakage of ink from the rear of the tube. With a dry socket at the ball point and consequent introduction of air and establishment of atmospheric pressure within the ball point the ink will flow toward the rear end upon inverting of the tube. This causes breaking up of the grease seal and escape of the ink from the open rear end of the tube. Accordingly the grease seal is not effective for preventing leakage of ink in a ball point pen under dry socket conditions.

Another attempt to prevent leakage comprises the use of a cover or cap, usually metal, over the rear end of the tube which closes the end of the tube except for a very small hole in the cap to provide the usual atmospheric pressure at the top of the ink column necessary for normal feeding of the ink to the ball point. This arrangement will not prevent leakage of ink rearwardly through the small hole, even if minute in size, under dry socket conditions at the ball.

The means and method of the present invention, which provide a leakproof ball pen under the adverse dry socket condition, involve a distinctly new and different approach from the prior attempts. This invention does not attempt to restrict the above-mentioned small hole or air vent sufficiently to stop the flow of ink therethrough for that has proven impractical. Furthermore, it does not attempt to make the grease seal impermeable and resistant to the rearward flow of the ink column under the force of atmospheric pressure within the ball point. Instead, it contemplates a flow of a minute amount of ink out of the rear end of the ink tube into one or more minute confining channels and limits the rate of flow of the ink such that the ink will dry and seal off the confining channels and thereby prevent liberation of the ink from the ink tube into the barrel. Since the ink is barred from reaching the barrel it cannot cause any damage to other components of the writing instrument or to the user's clothing or other surroundings. In fact, all of the ink except the very minute minute amount that is used to create the seal within the ink confining channels is retained in the ink tube or reservoir.

The new principle involved in this invention is that of metering out of the ink supply an extremely small amount of ink and permitting it to flow through a confining channel of microscopic dimensions wherein the very thin deposit of ink is exposed to air for a sufficient length of time to effect drying of the ink by the time it reaches the end of the confining channel and thereby effectively seals or plugs the channel. It is, in effect, a self-sealing operation and utilizes to good advantage the drying property of the ink when exposed to the atmosphere in the form of an extremely thin deposit.

The means used for carrying out this new method or principle of operation is subject to various physical forms or arrangements and comprises essentially one or more minute, substantially microscopic, channels or grooves. These channels or grooves or the like may be provided at a suitable location adjacent the rear end of the ink tube, such as, for example, in the outer surface of the ink tube wherein the channel may be formed by molding at the time the tube is molded. This arrangement of the ink sealing channel contemplates a closure cap fitted over the end of the ink tube and covering the minute channel except for the forward end thereof which should be free for communicating with the atmosphere. The rearward end of the channel would extend to or be adjacent the rearward interior of the ink tube for communication with the inside of the tube. Instead of a single channel, two or more channels may be used.

An alternate arrangement for the ink sealing channel comprises forming, for example by molding, the channel in the outer surface of a plug inserted in the rear end of the ink tube. The plug would be covered at the top by a closure cap extended over and covering the channel formed in the outer surface of the plug, except at the forward end where the channel is exposed to the atmosphere. The plug and cap may be preassembled if desired, before the plug is inserted in the open rear end of the ink tube, which may be made of metal or plastic, including transparent plastic through which the ink supply would be visible. The plug may be formed from a plastic material, such as polystyrene. Other possible locations for the channel or channels include the inside surface of the ink tube, the inside surface of the cap, and the exterior surface of the portion of the plug inserted in the rear of the ink tube, with provision in each instance for admitting atmospheric pressure to the top of the ink column. The forward portion of the plug and cap assembly may be placed within the rear end of the ink reservoir tube after the ink and grease material are placed therein, thereby removing the possibility of clogging of the grooves with grease during assembly. It is understood that materials other than polystyrene may be used.

In any of these illustrative, but non-limiting embodiments, a grease seal could be used at the top of the ink column in the ink tube. This grease seal that is used to stabilize the meniscus of the ink column would prevent, as above described, leakage of ink from the ink tube upon inversion of the pen under "wet socket" conditions, and if the pen were not inverted for too long a time, or other adverse circumstances such as elevated temperatures were not encountered, that would destroy the grease seal and leave the ink column without a stabilizing means, the pen could be reused upon placing it again in point down position. If for any reason the grease seal becomes ruptured, the channel or groove of the present invention serves as a foolproof means for preventing escape of the ink.

If desired, in capillary tubes which have an inherently stable ink meniscus, the grease seal may be omitted and the ink sealing groove or grooves used in accordance with the present invention will serve alone as an effective and reliable means for preventing leakage of ink. It will be understood that once the grooves are sealed off by the dried deposit of ink such that atmospheric pressure is no longer applied to the top of the ink column, the pen will be inoperative and will require a new ink cartridge unit. However, in the meantime, the sealed ink tube will have prevented damage to the users' clothing or other articles.

Effective use of the ink sealing channels of this invention contemplates the use of the so-called quick-drying or evaporable solvent types of ball pen inks, as distinguished from the prior types of non-evaporative oil base inks. The latter would not dry and accordingly would not effect sealing of the minute channel. The substantially microscopic ink sealing channel will permit entry of outside air into the ink tube, that is, it will establish atmospheric pressure within the ink tube at the top of the ink column. Although the ink is of the evaporative type, it is manifest that no appreciable loss of ink by evaporation could occur through the minute channel or channels formed either on the outside surface of the ink tube or on the outer surface of the plastic plug insert in the ink tube.

Where a grease seal is used at the top of the ink column, as above described, it will prevent evaporation of the ink, so that the space in the ink tube above the grease seal will normally contain air rather than ink vapor which might otherwise be present in this space in the absence of a grease seal. If a grease seal is not used, there will occur at least some slight evaporation of the ink sufficient to create an atmosphere of ink vapor within the ink tube space above the ink column, but even so, this space is so restricted in size that little if any appreciable loss of ink through evaporation in this manner will be experienced.

Insofar as the operation of the ink sealing channel or channels is concerned it is immaterial whether the ink tube contains an atmosphere of ink vapor, or whether it contains only air. In either case, the minute channel or channels formed in the ink tube or in the plug will effect progressive drying of the ink which is trapped in the ink sealing channel or channels by the time the ink reaches the end of its travel, that is, at the end of the channel exposed to the atmosphere.

Certain dimensions of the ink sealing channel to be used in accordance with this invention, and irrespective of its location, are important. In the first place, the overall size or volume of the channel will be minute and will not hold any appreciable supply of the ink or, in fact, diminish the ink supply in the ink tube by any appreciable amount. The depth of the ink sealing channel should be extremely small so that the amount of ink contained therein will be of minimum thickness, i. e., a thin film, and thereby facilitate quick drying of the ink. In the usual case the depth of the channel should not be greater than about 0.0025".

The width of this channel is less critical than the above-described depth of the channel and may vary from a microscopic dimension, which is not apparent to the naked eye, up to a width constituting a small fraction of an inch. Normally, the width of the channel will be in the order of about 0.002" to 0.040" or greater. The length of the channel, like the width, is not as critical as the depth dimension, but nevertheless should be sufficient to enable the ink to dry and seal effectively while it is flowing along this length dimension. Within the physical limits of the length of the ink tube, the length of the ink sealing channel is not limited and therefore may extend for the full length of the ink tube if desired. However, to limit the length of the closure cap, which is to cover the ink sealing channel, the length of the channel may advantageously be limited to a fraction of an inch, such as about ¼" to ½" in length. This channel may have an approximately rectangular cross section with parallel sides formed in the circular surface of the ink tube and a bottom formed on a circular arc concentric with the ink tube axis.

The leakproof ink reservoir tube of the present invention is described in further detail below in connection with the accompanying drawings, in which:

Fig. 1 is an elevation, partly in section, of an ink reservoir tube for ball point pens embodying the present invention;

Fig. 2 is an enlarged transverse sectional detail taken substantially on the line 2—2 in Fig. 1;

Fig. 3 is a vertical sectional detail taken substantially on the line 3—3 in Fig. 2;

Fig. 4 is a rear end view of the ink reservoir tube with the rear end closure cap therefor removed;

Fig. 5 is an exploded view of the ink reservoir and plug and cap components of the present invention;

Fig. 6 is a longitudinal sectional view of the assembled ink reservoir and plug and cap shown in Fig. 5;

Fig. 7 is an enlarged perspective view of the plug and cap assembly;

Fig. 8 is an enlarged top plan view of the plug showing the ink sealing channels or grooves;

Fig. 9 is a side elevation of the plug; and

Fig. 10 is a cross sectional view of the ink plug taken along the lines 10—10 of Fig. 9.

Referring now in detail to the drawings, and particularly to the illustrated embodiment shown in Figs. 1 through 4, the present invention comprises an ink tube 10 formed with a forward reduced diameter portion 12 proportioned to provide for extending the ink tube 10 through the normally restricted space at the writing end of a ball point pen barrel, a ball point element 14 being fitted at the forward end of the reduced diameter tube portion 12 to function in the usual manner.

Rearwardly, the ink tube 10 is fitted with a rear end closure cap 16. It will usually be preferable to provide a rear end ink tube portion 18 of sufficiently reduced diameter to receive the closure cap 16 so that its outer surface may provide a continuation in equal diameter from the main body portion of the tube 10. The closure cap 16 should be shouldered as at 20 so as to limit its forward extent when fitted on the rear end portion 18 of the ink tube 10, but may otherwise be shaped in any form desired rearwardly of the ink tube 10.

The ink sealing channels or grooves are formed in the exterior surface of the reduced diameter rear ink tube portion 18, as indicated by the reference numeral 22; three equally spaced longitudinal grooves 22 being shown in the embodiment illustrated, although any other practical number or spacing of grooves 22 might be employed, as previously noted. These grooves 22 extend forwardly from the rear end of the ink tube 10 for the entire length of the reduced diameter rear end portion 18, so that they reach to the shoulder 24 formed as the rear end portion is reduced in diameter from the main body portion of the ink tube 10, and it should be noted that the forward extent of the closure cap 16 is limited in spaced relation with respect to this shoulder 24, so that the grooves 22 extend forwardly beyond the closure cap 16 to open forwardly to the atmosphere. The grooves 22 are also arranged in communication rearwardly with the interior of the ink tube 10 by means of land portions or spacing pads 26 formed at the rear end face of the ink tube 10 to provide abutments on which the closure cap shoulder 20 may be bottomed to limit the forward extent of the closure cap 16 as noted above, while maintaining a major portion of the rear end face of the ink tube 10 spaced from the closure cap shoulder 20 and thereby allowing free communication between the grooves 22 and the interior of the ink tube 10.

In this way, the ink tube 10 remains normally vented at its rear end to the atmosphere for feeding of the ink supply therefrom to the ball point element 14 in the usual manner, while the grooves 22 are arranged as described above to become plugged or sealed by surface drying of any ink tending to flow outwardly therethrough and thereby render the ink tube of the present invention leakproof.

Referring now to the arrangement shown in Figs. 5 through 10 and particularly to Fig. 5, in which the parts are shown in exploded view for illustration, the ink reservoir plug is indicated generally by the numeral 30 and is adapted for insertion at the rear end of an ink reservoir tube 32 having a ball point unit 33 press fitted within the forward end thereof. The ink reservoir plug 30 comprises a rear cylindrical portion 34 and a forward cylindrical portion 36 separated by an annular flange 38 that is designed to abut the rear end of ink reservoir tube 32 when the ink reservoir plug 30 is inserted within ink tube 32 thereby limiting the depth to which ink plug 30 extends within ink tube 32. A closure cap 40 is arranged in fitting relation over the rear cylindrical portion 34 of ink reservoir plug 30 and forms a plug and cap assembly 42 when arranged thereon, as shown in Fig. 7. The plug and cap assembly can be preassembled and inserted in the rear end of the ink tube 32 after the filling thereof with ink.

Fig. 6 shows the plug and cap assembly 42 arranged within the rear end of the ink reservoir tube 32; the ink reservoir tube 32 being filled with ink and having a suitable grease follower material 44 on the ink column which normally stabilizes the ink column in a large capacity ink reservoir tube 32 and sweeps the walls of the ink tube 32 clean as the ink column is lowered. In some instances, the grease seal formed by the grease follower material 44 may be broken or ruptured as may occur when the ink supply is diminished and a dry socket condition is established at the ball of the pen breaking the capillary ink seal around the ball allowing atmospheric air pressure to be admitted to the ink column from the ball point end. As mentioned previously when this occurs and the pen is inverted, the grease plug and ink move rearwardly, and due to the fact that the grease has a greater resistance to movement than the ink, a condition exists which tends to rupture the grease plug and allows the ink to move rearwardly of the plug. It is necessary, therefore, to prevent the leakage of ink from the rear end of the ink reservoir in case the ink stabilizing means formed by the grease follower material 44 is broken and a dry socket condition exists.

For this purpose, at least one groove 46 is arranged exteriorly on the rear cylindrical portion 34 of the ink reservoir plug 30. More than one groove can be used if desired; three equally spaced longitudinal grooves being shown in the illustrated embodiment. Each of the grooves 46 extends forwardly from the rear end of the plug 30 for substantially the entire length of the rear cylindrical portion 34 and terminates at annular flange 38. Closure cap 40 is fitted on the plug rear portion 34 and the grooves 46 extend beyond the forward end of closure cap 40 while the opposite end of grooves 46 is in communication with the interior of ink tube 32.

The grooves 46 of restricted size are commonly formed on the plug 30 in the same manner and with the same dimensional limitations as those that are formed on the exterior surface of the tube.

Figs. 8, 9, and 10 further show ink plug 30 formed with slots 48 on the top face surface thereof to allow grooves 46 to communicate with the interior of the ink tube 32 when the plug and cap assembly 42 is inserted. Land portions 50 are formed between slots 48 and abut the interior rear surface of the closure cap 40 when the closure cap 40 is fitted thereon, thereby spacing the slots 48 from the interior rear surface of closure cap 40. A central aperture 52 is arranged through the ink reservoir plug 30 and completes the venting to the interior of the ink tube 32; aperture 52 having a forward enlarged diameter portion 54 which terminates rearwardly at a rear reduced diameter portion 56.

This application is a continuation-in-part of my application Serial No. 476,479, filed December 20, 1954, now abandoned.

The present invention has been described in detail above for purposes of illustration only and is not intended to be limited by this description or otherwise except as defined in the appended claims.

I claim:

1. A leakproof plastic ink tube for a ball pen having a ball point inserted in the forward writing end thereof, a supply in the tube of evaporable-solvent, quick-drying ink that forms an ink seal at the ball point, a closure cap fitted over the opposite rearward end of the tube and in sealing engagement therewith, at least one vent groove formed on the exterior surface portion of the tube in sealing engagement with the closure cap, said groove being in communication rearwardly with the interior of the tube and extending beyond the closure cap and communicating with the atmosphere, said vent groove being of a depth not greater than 0.0025 inch, a width of at least 0.002 inch, and a length of at least 0.250 inch and serving, during normal operation of the tube with the ink seal at the ball point, to admit air to the tube only sufficient to maintain atmospheric pressure in the interior of the tube, but restricting such admission sufficiently to maintain a solvent vapor saturated atmosphere in the tube to prevent drying of the ink therein, and also serving when the ink seal at the ball point is broken and atmospheric pressure is established against the ink column at the ball point end of the ink tube, to receive an infinitesimal amount of ink in the groove and expose it to the atmosphere therein to effect evaporation of the solvent with consequent drying of the very minute amount of ink at the portion of the groove communicating with the atmosphere and thereby effect sealing of the groove and preventing of the ink from escaping from the tube, said groove having no appreciable ink storage capacity and constituting the sole means for venting the ink tube, said tube upon sealing being inoperative and not subject to reuse.

2. A leakproof plastic ink tube for a ball pen having a ball point inserted in the forward writing end thereof, a supply in the tube of evaporable-solvent, quick-drying ink that forms an ink seal at the ball point, a closure means concentric with and having a surface portion in sealing engagement with a surface portion of and closing the opposite rearward end of the tube, one of said surface portions having at least one vent groove formed thereon, said groove being in communication at one end with the interior of the tube and extending into communication with the atmosphere, said vent groove being of a depth not greater than 0.0025 inch, a width of at least 0.002 inch, and a length of at least 0.250 inch, and serving, during normal operation of the tube with the ink seal at the ball point, to admit air to the tube only sufficient to maintain atmospheric pressure in the interior of the tube, but restricting such admission sufficiently to maintain a solvent vapor saturated atmosphere in the tube to prevent drying of the ink therein, and also serving when the ink seal at the ball point is broken and atmospheric pressure is established against the ink column at the ball point end of the ink tube, to receive an infinitesimal amount of ink in the groove and expose it to the atmosphere therein to effect evaporation of the solvent with consequent drying of the very minute amount of ink at the portion of the groove communicating with the atmosphere and thereby effect sealing of the groove and preventing of the ink from escaping from the tube, said groove having no appreciable ink storage capacity and constituting the sole means for venting the ink tube, said tube upon sealing being inoperative and not subject to reuse.

3. A leakproof ink tube as defined in claim 2 and in which a plurality of the grooves are molded in the plastic tube.

4. A leakproof plastis ink tube for a ball pen having a ball point inserted in the forward writing end thereof, a supply in the tube of evaporable-solvent, quick-drying ink that forms an ink seal at the ball point, a closure means concentric with and having a surface portion in sealing engagement with a surface portion of and closing the opposite rearward end of the tube, one of said surface portions having at least one vent groove formed thereon, said groove being in communication at one end with the interior of the tube and extending into communication with the atmosphere, said vent groove being of a depth not greater than 0.0025 inch, a width of at least 0.002 inch, and a length of at least 0.250 inch, and serving, during normal operation of the tube with the ink seal at the ball point, to admit air to the tube sufficient to maintain atmospheric pressure in the interior of the tube and being capable of restricting such admission sufficiently to maintain a solvent vapor saturated atmosphere in the tube to prevent drying of the ink therein, and also serving when the ink seal at the ball point is broken and atmospheric pressure is established against the ink column at the ball point end of the ink tube, to receive an infinitesimal amount of ink in the groove and expose it to the atmosphere therein to effect evaporation of the solvent with consequent drying of the very minute amount of ink at the portion of the groove communicating with the atmosphere and thereby effect sealing of the groove and preventing of the ink from escaping from the tube, said groove having no appreciable ink storage capacity and constituting the sole means for venting the ink tube, said tube upon sealing being inoperative and not subject to reuse.

5. In combination with a ball point and ink reservoir unit having a supply of quick-drying ink therein, a plug and cap assembly inserted within the rear end of the ink reservoir tube of said unit, the plug of said assembly having at least one exterior vent groove extending forwardly from the rear end thereof, and the cap of said assembly fitted on the rear end of said plug in covering relation with respect to said groove, said groove extending forwardly beyond the forward end of said cap and communicating forwardly with the atmosphere while communicating rearwardly with the interior of said ink reservoir tube, said vent groove being of a depth not greater than 0.0025 inch, a width of at least 0.002 inch, and a length of at least 0.250 inch, and serving, during normal operation of the tube with an ink seal at the ball point, to admit air to the tube sufficient to maintain atmospheric pressure in the interior of the tube and being capable of restricting such admission sufficiently to maintain a solvent vapor saturated atmosphere in the tube to prevent drying of the ink therein, and also serving when the ink seal at the ball point is broken and atmospheric pressure is established against the ink column at the ball point end of the ink tube, to receive an infinitesimal amount of ink in the groove and expose it to the atmosphere therein to effect evaporation of the solvent with consequent drying of the very minute amount of ink at the portion of the groove communicating with the atmosphere and thereby effect sealing of the groove and preventing of the ink from escaping from the tube, said groove having no appreciable ink storage capacity and constituting the sole means for venting the ink tube.

6. In combination with a ball point and ink reservoir unit having a supply of quick-drying ink therein, a plug and cap assembly inserted within the rear end of the ink reservoir tube of said unit, said cap being concentric with and having a surface portion in sealing engagement with a surface portion of and closing the rearward end of the plug, one of said surface portions having at least one vent groove formed thereon, said groove being in communication at one end with the interior of the tube and extending into communication with the atmosphere, said vent groove being of a depth not greater than 0.0025 inch, a width of at least 0.002 inch, and a length of at least 0.250 inch and serving, during normal operation of the tube with the ink seal at the ball point to admit air to the tube only sufficient to maintain atmospheric pressure in the interior of the tube and being capable of restricting such admission sufficiently to maintain a solvent vapor saturated atmosphere in the tube to prevent drying of the ink therein, and also serving when the ink seal at the ball point is broken and atmospheric pressure is established against the ink column at the ball point end of the ink tube, to receive an infinitesimal amount of ink in the groove and expose it to the atmosphere therein to effect evaporation of the solvent with consequent drying of the very minute amount of ink at the portion of the groove communicating with the atmosphere and thereby effect sealing of the groove and preventing of the ink from escaping from the tube, said groove having no appreciable ink storage capacity and constituting the sole means for venting the ink tube.

References Cited in the file of this patent

UNITED STATES PATENTS

| 2,642,042 | Gowland | June 16, 1953 |

FOREIGN PATENTS

| 637,331 | Great Britain | May 17, 1950 |
| 816,966 | Germany | Oct. 15, 1951 |
| 517,594 | Belgium | Feb. 28, 1953 |
| 1,045,722 | France | July 1, 1953 |